United States Patent [19]

F'Geppert

[11] 4,149,430
[45] Apr. 17, 1979

[54] BRAKE FOR BALL SCREW

[75] Inventor: Erwin F'Geppert, Novi, Mich.

[73] Assignee: The United States of America as represented by the Secretary of the Army, Washington, D.C.

[21] Appl. No.: 836,276

[22] Filed: Sep. 26, 1977

[51] Int. Cl.² ............... F16H 1/18; F16H 25/08; F16H 57/10; B60K 41/20
[52] U.S. Cl. ............... 74/424.8 R; 74/89.15; 74/411.5; 192/2
[58] Field of Search ........... 74/89.15, 424.8 R, 411.5; 192/2

[56] References Cited

U.S. PATENT DOCUMENTS

| 3,449,978 | 6/1969 | Stimpson | 74/411.5 |
| 3,543,598 | 12/1970 | Lanzenberger | 74/411.5 X |

Primary Examiner—Leonard H. Gerin
Attorney, Agent, or Firm—Peter A. Taucher; John E. McRae; Nathan Edelberg

[57] ABSTRACT

In a ball screw connected between an actuating motor and load, the improvement comprising a friction brake mechanism carried by the nut section of the screw for automatically locking the nut and screw together when the motor is de-energized. The invention prevents the load from producing dangerously high free-wheeling rotation of the screw that could centrifugally destruct the motor.

8 Claims, 4 Drawing Figures

LOAD UP     LOAD DOWN

BRAKE FOR BALL SCREW

The invention described herein may be manufactured, used, and licensed by or for the Government for governmental purposes without payment to me of any royalty thereon.

BACKGROUND AND SUMMARY OF THE INVENTION

This invention relates to mechanisms for retaining or locking a ball nut-screw mechanism when the actuating motor is de-energized. The mechanism would find principle use in a situation where the motor is connected to the screw to rotate it in the forward direction, and a heavy load is connected to the nut to produce a potentially dangerous reverse rotation of the screw when the motor is de-energized. At the moment of motor-deenergization the load can exert a tremedous axial force on the nut; the very low frictional connection defined by the circulating balls tends to produce a substantial reverse torque on the screw so that the screw and connected rotor (armature) can reverse rotate at tremedous speeds sufficient to destruct the motor.

An aim of the present invention is to provide a brake mechanism that automatically locks the nut and screw together when the electric motor actuator is de-energized. The brake is designed so that it exerts a braking action only when the motor is de-energized, not when the motor is running. Therefore the low friction advantages of the ball nut-screw structure are retained without having the dangerous high speed reverse rotation of the screw.

The mechanism of this invention is somewhat similar to the brake mechanism shown in U.S. Pat. No. 3,924,479 issued to H. Lanzenberger on Dec. 9, 1975, except that in my mechanism the brake action takes place between the nut and screw. Lanzenberger apparently provides a brake between the screw and stationary support surface. One disadvantage in the Lanzenberger arrangement is that the brake is continually engaged so that the actuating motor must overcome the brake friction in order to rotate the screw; a relatively large motor is required.

THE DRAWINGS

Figure 2:
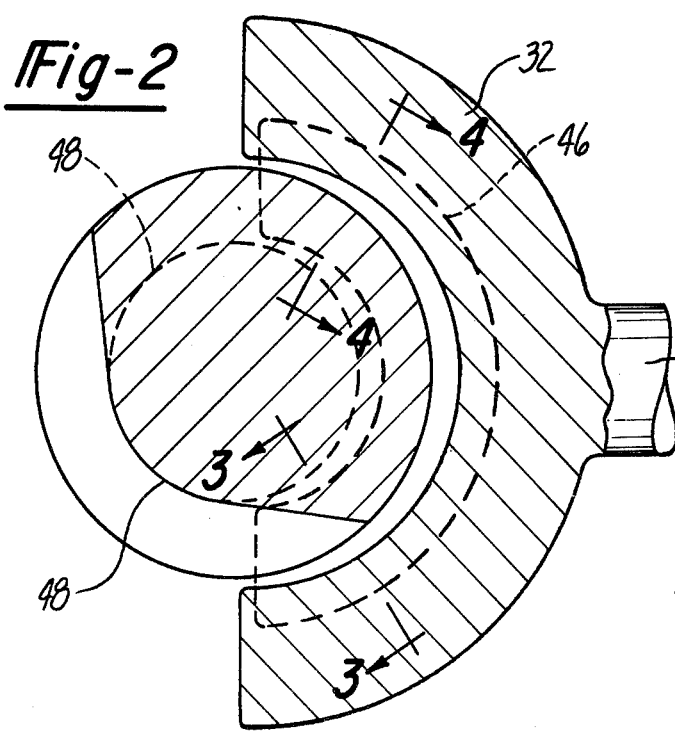
FIG. 2 is a fragmentary sectional view taken on line 2—2 in FIG. 1.
Figure 3:
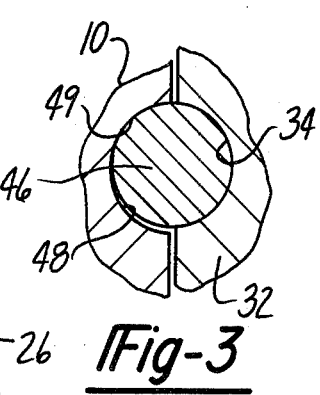
Figure 4:
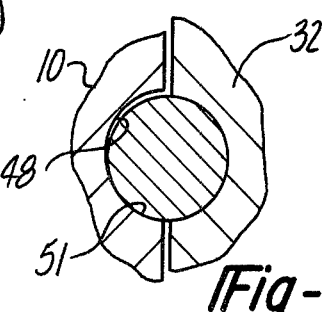

FIGS. 3 and 4 are fragmentary sectional views taken on lines 3—3 and 4—4 in FIG. 2.

Figure 1:
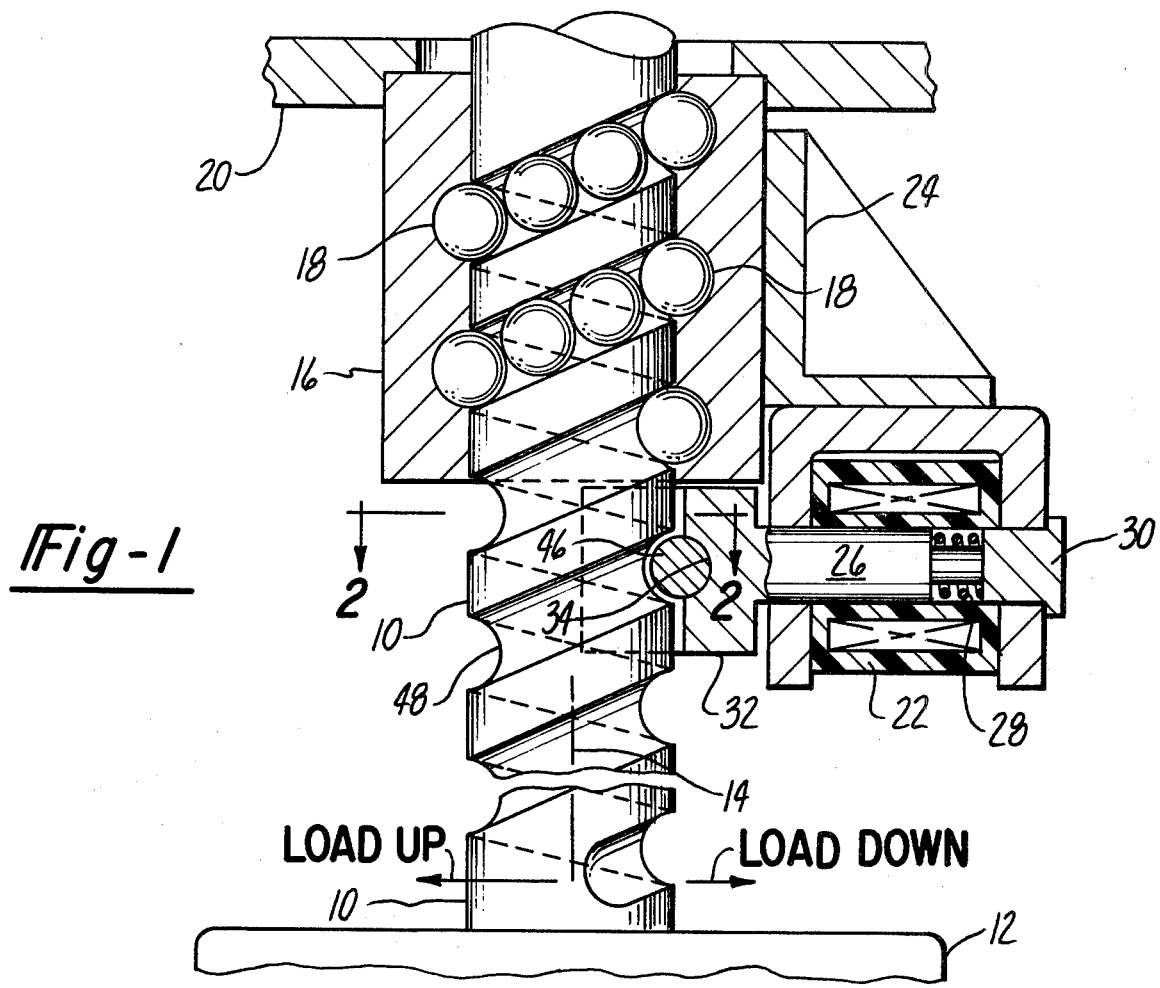
FIG. 1 is an elevational view, with parts in section, illustrating one embodiment of my invention.

FIG. 1 illustrates one embodiment of my invention designed to function as a jack or hoist for moving a load 20 vertically between lowered and raised positions. The invention has other uses than in a jack structure, but explanation of the invention is facilitated by reference to such an environment. In the specific construction shown in FIG. 1 the jack comprises a vertically oriented screw 10 connected at its lower end to the armature of an electric motor 12; if a speed reducer is used between the motor and screw then the screw would be connected to the output gear of the reducer. Energization of the motor produces rotation of screw 10 around its central axis 14. Cooperating with screw 10 is a nut 16 suitably grooved to provide an endless raceway for a system of circulating balls 18. The conventional ball pickoff and ball return tube are not shown in the drawing; however the ball screw-nut would be a conventional assembly, as produced for example by Beaver Precision Products Inc. of 1970 Big Beaver Road, Troy, Mich.

Load 20 is illustrated as a collar or apertured plate secured to nut 16 so that the nut and plate constitute one rigid structure movable vertically on screw 10. The load is prevented from rotating by non-illustrated mechanism. It will be seen that operation of motor 12 in one direction causes load 20 to move upwardly. Operation of motor 12 in the reverse direction would cause load 20 to move down. However, in some situation load 20 would be of such magnitude that reverse energization of the motor would not be required to produce downward movement of the load. When motor 12 is de-energized a very large load 20 applies a vertical force on nut 16 which acts on the recirculating balls 18 to automatically rotate screw 10 at relatively high speed. In some cases such reverse rotational speeds have exceeded 20,000 r.p.m., sufficient to centrifically destruct the motor.

The present invention relates to a brake mechanism for automatically locking nut 16 and screw 10 together when motor 12 is de-energized. With the nut and screw locked together the nut cannot produce dangerous high speed rotation of the screw. The brake mechanism can take various structural configurations. As shown in FIGS. 1 and 2, the brake mechanism comprises a solenoid coil 22 suitable affixed to nut 16 by means of a bracket 24. An armature 26 for the solenoid is urged in a leftward direction by means of a compression coil spring 28 when the soienoid coil is de-energized. When the coil is energized armature 26 is drawn rightwardly to its illustrated position contacting pole piece 30.

Armature 26 is integrally or otherwise affixed to a semi-conductor yoke 32 that partially encircles screw 10 for a circumferential distance of approximately 180 degrees. The concave frontal surface of yoke 32 is formed with a helical groove 34 that constitutes a mounting surface for a helical rod-like friction element 46; the rod-like element can be secured to yoke 32 in any suitable manner, as for example by welding. It will be seen that when the solenoid 22 is de-energized armature 26 projects rod element 46 toward screw 10 to enable element 46 to exert a braking or locking action on the screw. When solenoid coil 22 is energized friction element 46 is withdrawn to its FIG. 1 position wherein said element if floatably disposed within the helical groove 48 of the screw in spaced relation to the groove surface; element 46 therefore presents no interference to screw movement.

With the illustrated arrangement the solenoid coil 22 would be electrically interconnected with the motor 12 windings so that energization of the motor in the "load up" direction would actuate the solenoid coil, thereby allowing screw 10 to be rotated by the motor for thus raising load 20. De-energization of the motor would de-activate solenoid coil 22, thereby enabling spring 28 to project armature 26 and friction element 46 into braking engagement with the screw. If desired the solenoid and spring could be redesigned so that the coil would activate the brake and the spring would de-activate the brake.

In the illustrated arrangement brake action occurs automatically when motor 12 is de-energized. At that time solenoid 22 is de-activated so that spring 28 projects armature 26 toward screw 10. Rod element 46 moves into frictional contact with groove surface 48 of the screw helical thread, thereby tending to lock the screw and nut 16 together; this action prevents destructive high speed rotation of the screw that might otherwise result from an unchecked vertical load on the nut.

Rod element 46 is a helical element having a surface contour that conforms to the contour of helical groove 48. However the rod element preferably has a slightly different pitch than helical groove 48, thus producing a wedge type lock action between the rod element and the screw. The wedge action may be visualized from FIGS. 3 and 4, wherein the rod element is engaged with roof surface 49 of groove 48 near one end of the rod element (FIG. 3); the other end of the rod element is engaged with floor surface 51 of groove 48 (FIG. 4). The rod element tends to press upwardly on roof area 49 and downwardly on floor area 51, such that the lock action is primarily in a vertical plane. The movement direction of the brake element takes place in a horizontal direction coincident with the axis defined by armature 26. Since the vertical lock action of element 46 is normal to the horizontal movement direction of armature 26 there is a lessened tendency for the brake force to displace friction element 46 from its brake position. It is believed that this action will promote effective braking even when a relatively low power solenoid actuator 22 is utilized.

A principle advantage of this invention is the relatively small size of the brake mechanism. An additional advantage is the fact that the brake mechanism could in many cases be supplied as an add-on attachment for an existing or new ball screw mechanism. The brake does not require modification of the ball screw other than a means for attachement to the nut.

The above description contemplates that motor 12 will be rigidly mounted in a stationary position, and that load 20 will be mounted for vertical movement. It will be understood however that member 20 could be stationary and motor 12 affixed to a vetically traveling mechanism; the action of the brake would be unaffected. The illustrated system contemplates a vertical screw and vertically-acting load, but it will be understood that the screw and load could act in a horizontal direction or various degress of inclination.

I wish it to be understood that I do not desire to be limited to the exact details of construction shown and described for obvious modifications will occur to a person skilled in the art.

I claim:

1. In a ball nut-screw mechanism wherein a motor is connected to the screw to rotate same in the forward direction, and a load is connected to the nut to rotate the screw in the reverse direction: the improvement comprising a brake mechanism carried on the nut to lock the screw and nut together when the motor is de-energized, thereby preventing reverse rotation of the screw; said brake mechanism comprising a friction element floatably disposed within the helical groove defined by the screw thread so that said friction element presents no interference to screw movement; and power means responsive to de-activation of the motor for advancing the friction element into braking engagement with the helical groove surface on the screw.

2. In the mechanism of claim 1, the further improvement wherein the friction element has a friction surface comforming to the surface contour of the helical groove in the screw, whereby the friction element has substantial area engagement with the helical groove surface during the braking period.

3. The mechanism of claim 1 wherein the friction element partially encircles the screw for a circumferential distance approximating 180 degrees; said friction element having a substantially semi-circular surface contour that mates with the contour of the screw thread.

4. The mechanism of claim 1 wherein the power means comprises a solenoid and spring arranged so that de-energization of the solenoid enables the spring to project the friction element toward the helical groove surface on the screw.

5. The mechanism of claim 1 wherein the friction element is mounted so that it moves in a radical direction normal to the axis of the screw.

6. The mechanism of claim 5 wherein the friction element comprises a rod-like member having a helical curvature conforming to the pitch of the screw thread; said rod-like member having a circular surface contour conforming to the cross sectional contour of the thread, whereby the rod-like member has extensive surface area engagement with the screw during the braking period.

7. the mechanism of claim 1 wherein the friction element comprises a rod-like member is helical in the direction of its length; the pitch of the helical groove in the screw bring slightly different than the pitch of the helical rod-like member, whereby one end area of said member engages one side surface area of the groove, and the other end area of said member engages the other side surface of the groove.

8. The mechanism of claim 7 wherein the power means comprises a solenoid having an operating axis oriented on the radius of the screw, said rod-like friction member being mounted on a yoke that constitutes an armature for the above-mentioned solenoid.

* * * * *